Patented Oct. 12, 1943

2,331,849

UNITED STATES PATENT OFFICE 2,331,849

PREPARATION OF TOCOPHEROLLIKE PRODUCTS

Lee Irvin Smith, Minneapolis, Minn., assignor to Regents of the University of Minnesota, Minneapolis, Minn., a corporation of Minnesota No Drawing. Application July 14, 1939, Serial No. 284,456

3 Claims. (Cl. 260—333)

The present invention relates to methods of making parahydroxy coumarans and chromans, and more particularly to methods of making compounds related to the tocopherols.

Heretofore, such parahydroxy chromans and coumarans have been prepared by the reaction of hydroquinone compounds, such as alkyl poly substituted hydroquinone, with dienes or with allylic halides. Where the hydroquinone compound of such synthesis has all positions substituted except one position ortho to the hydroxyl group, the resultant tocopherol-like compounds are obtained in high yields of great purity, but where the hydroquinone compound is unsubstituted or has more than one vacant position, various side reaction products are obtained which are undesirable.

According to the present invention, para hydroxy chromans and coumarans may be prepared from para unsubstituted chromans and coumarans derived from phenolic compounds by the introduction of a hydroxyl radical para to the bridge oxygen, and it is therefore an object of the present invention so to prepare such compounds by such methods.

Specifically, an object is to provide procedures for introducing a hydroxyl radical para to the bridge oxygen of para unsubstituted chromans or coumarans by utilizing diazotized aromatic compounds.

It is an alternative object of the invention to provide a method of preparing para hydroxy coumarans or chromans by carrying out a series of steps upon ortho allylic phenols, such steps being carried out in any desired order. The steps include (1) coupling an ortho allylic phenol having the para position vacant, with an aromatic diazonium salt, (2) cyclization; and (3) conversion into the corresponding para hydroxy coumarans or chromans, and it is therefore an object of the invention to provide reactions for the said phenols including such steps in any desired order.

It is also an object of the invention to utilize the herein disclosed procedures and all obvious variations, extensions and modifications thereof for the preparation of the types of compounds herein referred to.

It is also an object of the invention to utilize any known or hereinafter discovered effects of the described processes and products.

Other and further objects will be apparent and implied from the invention described and claimed herein.

In making para hydroxy chromans and coumarans in accordance with the present invention, the starting material utilized may be any para unsubstituted chroman or coumaran, such as those derived from the phenols. As representatives of these, reference is made to compounds such as 2, 2, 5, 7, 8-penta-methyl chroman or 2, 4, 6, 7-tetra methyl coumaran. Using the para-unsubstituted chroman or coumaran starting material, the introduction of the para hydroxyl is accomplished by the following procedure.

The para unsubstituted chroman or coumaran is first treated with an aromatic diazonium compound such as diazotized sulfanilic acid or diazotized para nitro aniline, to produce an intermediate azo dye compound of the invention. This is followed by a reductive cleavage of the resultant azo dye primary intermediate, which leads to the para amino chroman or coumaran, which may be considered as secondary intermediates. The final step consists in the replacement of the amino group by a hydroxyl group.

As an alternative to the above methods, the diazo coupling may be caused to take place with the formation of the corresponding ortho allylic phenol intermediate which is then cyclized, and the resulting para azo chroman (or coumaran) treated as indicated above to give the corresponding para hydroxy compounds, or as a further alternative the para azo may be replaced by hydroxy groups and the cyclization caused to take place as the last step.

As illustrations of the above procedures several examples are given below, but these must not be understood to be limitations upon the general method and procedures herein described and claimed.

*Example I*

A diazotized sulfanilic acid is first prepared by any suitable procedure such as follows: Two and five tenths grams of 2,4-dinitro aniline is diazotized by dissolving in 15 cc. of hot glacial acetic acid 1.5 cc. of concentrated sulphuric acid, and the solution is then thoroughly cooled and 1 gram of sodium nitrite added in small amounts with stirring. An additional 5 cc. of glacial acetic acid is then added to facilitate stirring and the mixture is then admixed with 30 cc. of ethyl ether and decanted for purification. The thus partially purified diazotized dinitro aniline is then twice redissolved in acetic acid and precipitated for further purification and is finally dissolved in 15 cc. of acetic acid. Thereupon 2,3,5-trimethyl-6-allyl phenol, 1.73 grams is dissolved in 7.9 cc. of 10% sodium hydroxide and to this is added 2.07 grams of the diazotized sulfanilic acid prepared as indicated. The mixture thereupon became dark red, and is allowed to stand at room temperature for approximately two hours. To the solution there is then added about 4.53 grams of sodium hydrosulphite and the entire mixture is heated, with stirring until it reaches 90° C., whereupon it becomes colorless. Upon cooling, a light yellow, needle, crystalline product separated and is recovered by filtration, 1.7 grams of the crystalline intermediate product being obtained.

To the separated crystalline product thus obtained, there is added an oxidizing solution consisting of 5.5 grams of ferric chloride hexahydrate in 5 cc. of water and 2 cc of concentrated hydrochloric acid. Steam is then passed through the mixture, whereupon the quinone compound, which is a liquid, is driven off and is recovered from the steam distillate by extraction with ethyl ether, 1.43 grams of 2,3,5-trimethyl-6-allyl quinone being obtained.

1.43 grams of the thus produced 2,3,5-trimethyl-6-allyl quinone is converted to 2,3,5-trimethyl-6-allyl hydroquinone by treatment with an excess of zinc in a mixture of 10 grams glacial acetic acid and 3 cc. of water. The mixture of quinone, zinc, acetic acid and water is heated under reflux for 15 minutes and the hydroquinone compound recovered by pouring the refluxed mixture into ice and water, the hydroquinone compound separating in the form of white needle-like crystals. The yield of trimethyl allyl hydroquinone thus formed is 1.16 grams.

The intermediate trimethyl allyl hydroquinone thus produced is cyclized to 2,4,6,7-tetramethyl 5 hydroxy coumaran by the following procedure:

One gram of trimethyl allyl hydroquinone and 2 grams pyridinium chloride are heated to a temperature of 205° C. for one hour. The reaction mixture is then dissolved in ethyl ether, the ether solution washed with dilute sulphuric acid, and the ether layer steam-distilled. The 2,4,6,7-tetramethyl-5-hydroxy coumaran distills over and crystallizes out as white needles, the yield being 620 mg. and the melting point being about 129–130° C.

It will be noted that the foregoing procedures involve in general the steps of (1) introducing a substituent para to the oxygen and (2) replacement of this substituent by a hydroxyl group in one or more operations. In addition, such of the foregoing procedures as involve the ortho allylic phenols include as a third step (3) cyclization to form the chromans or coumarans. The order in which these steps are carried out is not material, thus providing several alternative routes to the final para hydroxy chromans and coumarans. The choice of the route taken depends upon the physical properties of the intermediates involved and particularly the yields in each of the steps, and may be widely varied to accommodate the specific materials being operated upon. Thus, the order of the steps may be any order desired.

These and other obvious variations may be made in any of the procedures herein described and will be understood to be within the purview of the claimed invention.

I claim:

1. The process of producing tocopherol-like compounds which comprises coupling an ortho allylic phenol having vacant the position para to the hydroxyl group with an aromatic diazonium compound, reducing and then oxidizing the resultant product to the corresponding ortho allylic quinone, reducing said quinone to the corresponding ortho allylic hydroquinone and cyclizing said hydroquinone to the tocopherol-like compound.

2. The process of producing tocopherol-like compounds which comprises reacting an ortho allylic phenol having vacant the position para to the hydroxyl group with diazotized sulfanilic acid, reducing and then oxidizing the thus formed product to the corresponding ortho allylic quinone, thereafter reducing the said quinone to the corresponding ortho allylic hydroquinone, and cyclizing said allylic hydroquinone to the tocopherol-like compound.

3. The process of producing tocopherol-like compounds which comprises reacting an ortho allylic phenol having vacant the position para to the hydroxyl group with diazotized para-nitro aniline, reducing and then oxidizing the thus formed product to the corresponding quinone, thereafter reducing the said quinone to the corresponding ortho allylic hydroquinone and cyclizing said ortho allylic hydroquinone to the tocopherol-like compound.

LEE IRVIN SMITH.